T. C. BAXTER.
POTATO PLOW.

No. 180,520.   Patented Aug. 1, 1876.

WITNESSES:   INVENTOR:
Francis M'Ardle,   T. C. Baxter
John Goethals   BY
   ATTORNEYS.

UNITED STATES PATENT OFFICE.

TUBAL C. BAXTER, OF MONTICELLO, KANSAS.

IMPROVEMENT IN POTATO-PLOWS.

Specification forming part of Letters Patent No. 180,520, dated August 1, 1876; application filed May 27, 1876.

*To all whom it may concern:*

Be it known that I, TUBAL CAIN BAXTER, of Monticello, in the county of Johnson and State of Kansas, have invented a new and Improved Potato-Plow, of which the following is a specification:

My invention consists of a forked beam, with a land-side and cutter to each branch of the fork, between which is a shovel-plow fixed on an easy incline, for the potatoes and the earth to be forced along over the rear end, from which extend a number of rods, suitably arranged to let the earth sift through, and to carry the potatoes back and discharge them in a row on the top of the earth.

Figure 1:
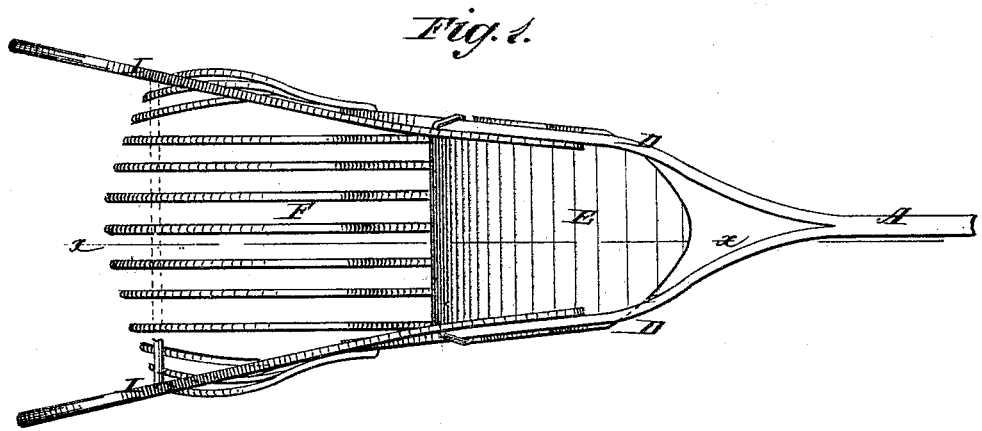
Figure 2:
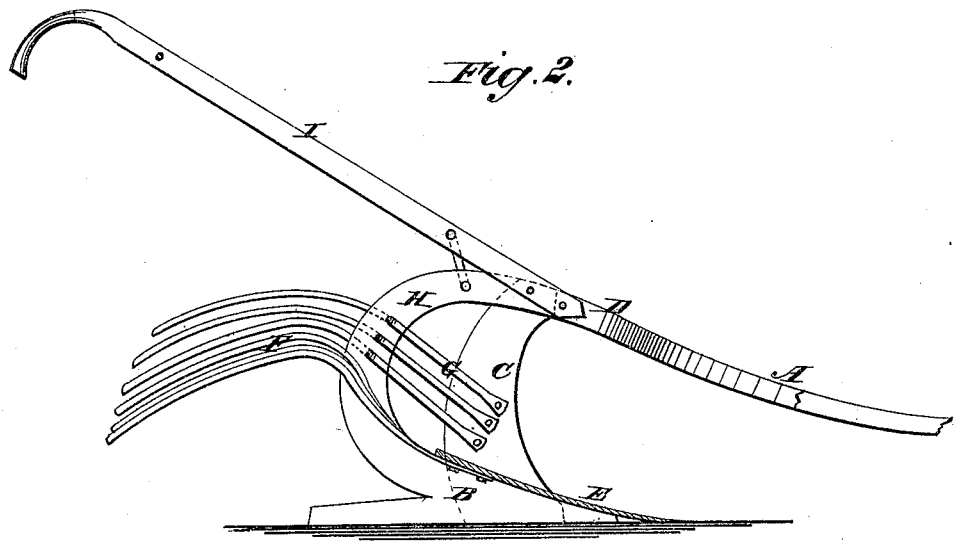

Figure 1 is a plan view of my improved potato-plow. Fig. 2 is a sectional elevation taken on line $x$ $x$.

A is the plow-beam, which is forked at the rear end, and has a land-side, B, and cutter C, attached to each of its forks D. E is the shovel-plow, which is suitably arranged between the land-side to run under the row of potatoes, for forcing them along with the earth up over the rear end onto the riddle or sieve of rods F, for separating them from the earth, and discharging them on the ground at the rear.

The plow and the rods widen rearward, to allow the earth to spread, and thus facilitate the separating of the earth and potatoes, and they are arranged in a kind of trough shape to deliver the potatoes close together.

G represents fender-rods, attached to the cutters and standards H of the land-sides, to prevent weeds, &c., from clogging between them. I represents handles to the plow.

This arrangement makes a very simple and cheap machine, which is also efficient and easy to manage.

Having thus described my invention, what I claim as new, and desire to secure by Letters Patent, is—

1. The combination of branched beam A D, land-sides B B, cutters C C, plow E, and rods F G, all constructed and arranged substantially as and for the purpose specified.

2. The fender-rods G, combined with cutters C and standards H, substantially as specified.

TUBAL CAIN BAXTER.

Witnesses:
A. M. PIPER,
F. P. WHITCHER.